(12) United States Patent
Gray, Jr.

(10) Patent No.: US 6,415,607 B1
(45) Date of Patent: Jul. 9, 2002

(54) HIGH EFFICIENCY, AIR BOTTOMING ENGINE

(75) Inventor: Charles L. Gray, Jr., Pinckney, MI (US)

(73) Assignee: The United States of America as represented by the Administrator of the U.S. Environmental Agency, Washington, DC (US)

( * ) Notice: Subject to any disclaimer, the term of this patent is extended or adjusted under 35 U.S.C. 154(b) by 0 days.

(21) Appl. No.: 09/953,145

(22) Filed: Sep. 17, 2001

Related U.S. Application Data (62) Division of application No. 09/752,684, filed on Jan. 3, 2001, now Pat. No. 6,301,891, which is a division of application No. 09/356,338, filed on Jul. 19, 1999, now Pat. No. 6,216,462.

(51) Int. Cl.[7] .................................. F02G 3/00
(52) U.S. Cl. .................... 60/616; 60/59 R; 91/500; 91/505; 417/269
(58) Field of Search ............... 60/616, 618, 59 R; 123/68; 417/269; 91/500, 505; 92/57

(56) References Cited

U.S. PATENT DOCUMENTS

| | | | | |
|---|---|---|---|---|
| 1,986,584 A | * | 1/1935 | Koplar | 91/500 |
| 2,090,214 A | * | 8/1937 | Maniscalco | 91/505 |
| 2,699,123 A | * | 1/1955 | Bonnette et al. | 91/505 |
| 3,007,513 A | * | 11/1961 | Aspelin | 91/500 |
| 3,037,489 A | * | 6/1962 | Douglas | 92/57 |
| 3,708,979 A | * | 1/1973 | Bush et al. | 60/59 R |
| 4,333,424 A | * | 6/1982 | McFee | 123/68 |
| 4,350,079 A | * | 9/1982 | Drahtmuller | 91/499 |
| 4,901,531 A | * | 2/1990 | Kubo et al. | 60/618 |
| 5,022,310 A | * | 6/1991 | Stewart et al. | 417/269 |
| 5,052,898 A | * | 10/1991 | Cook | 417/269 |
| 5,176,066 A | * | 1/1993 | Kanamura et al. | 417/269 |
| 5,249,506 A | * | 10/1993 | Willimczik | 92/57 |
| 6,216,462 B1 | * | 4/2001 | Gray, Jr. | 60/616 |

* cited by examiner

Primary Examiner—Thomas Denion
Assistant Examiner—Thai-Ba Trieu
(74) Attorney, Agent, or Firm—Lorusso & Loud (57) ABSTRACT

An air bottoming powertrain, suitable for use in automobiles includes an internal combustion engine, a compressor which receives gaseous working fluid and compresses it to an elevated pressure, a cooler for operating the compressor isothermally, an expander for deriving work from the compressed gas and a heat exchanger located in the compressed gas line for indirect heat exchange between the compressed working fluid and exhaust gas from the internal combustion engine. The expander may have a cylindrical barrel with a plurality of cylinders arranged in the circle and open at one end face of the cylinder barrel, which end face is sealed closed by a valve plate. The cylinder barrel and valve plate allow relative rotation therebetween to drive an output shaft, driven by compressed gas from the compressor. An alternative expander is a Scotch Yoke piston motor which includes plural paired and axially aligned cylinders on opposing sides of an output shaft. In the Scotch Yoke-type piston motor each cylinder is axially divided by a thermal brake into a thermally insulated outer portion and cooled inner portion. Likewise, each piston is axially divided by a thermal brake into a cooled inner section and a thermally insulated outer section.

9 Claims, 5 Drawing Sheets

HIGH EFFICIENCY, AIR BOTTOMING ENGINE

CROSS REFERENCE TO RELATED APPLICATIONS

This application is a division of U.S. Ser. No. 09/752,684 filed Jan. 3, 2001, now U.S. Pat. No. 6,301,891 which is a division of U.S. Ser. No. 09/356,338 filed Jul. 19, 1999, now U.S. Pat. No. 6,216,462.

BACKGROUND OF THE INVENTION

1. Field of the Invention

The field of the present invention is internal combustion engines for motor vehicles and, in particular, utilization of the heat energy normally discarded in the exhaust of internal combustion engines by converting the heat to mechanical work in a highly efficient manner, thereby increasing the overall efficiency of fuel utilization.

2. Prior Art

The growing utilization of automobiles greatly adds to the atmospheric presence of various pollutants including oxides of nitrogen and greenhouse gases such as carbon dioxide.

Internal combustion engines create mechanical work from fuel energy by combusting the fuel over a thermodynamic cycle consisting typically of compression, ignition, expansion, and exhaust. Expansion is the process in which high pressures created by combustion are deployed against a piston, converting part of the released fuel energy to mechanical work. The efficiency of this process is determined in part by the thermodynamic efficiency of the cycle, which is determined in part by the final pressure and temperature to which the combusted mixture can be expanded while performing work on the moving piston.

Generally speaking, the lower the pressure and temperature reached at the end of the expansion stroke, the greater the amount of work that has been extracted. In conventional engine designs, expansion is limited by the fixed maximum volume of the cylinder, since there is only a finite volume available in which combusting gases may expand and still perform work on the piston. This makes it impractical to expand to anywhere near ambient temperature and pressure, and instead a large amount of energy remains and is normally discarded with the exhaust. The production of work from the initial expansion of combustion gases is commonly referred to as "topping," while the extraction of work from once-expanded gases is referred to as a "bottoming cycle."

Bottoming cycles are commonly employed as part of the combined cycle operation of steam power plants. "Performance Analysis of Gas Turbine Air-Bottoming Combined System," *Energy Conversion Management*, vol. 37, no. 4, pp. 399–403, 1996; and "Air Bottoming Cycle: Use of Gas Turbine Waste Heat for Power Generation," *ASME Journal of Engineering for Gas Turbines and Power*, vol. 118, pp. 359–368, April 1996 are representative of the state of the art in this field. Exhaust heat rejected from a primary gas turbine (the topping cycle) is used to heat water to produce steam that is expanded in a secondary steam turbine (the bottoming cycle) Although in this case the working fluid of the bottoming cycle is steam, other fluids having more favorable physical or thermodynamic properties may be used, for instance ammonia-water mixtures or even a gas.

Bottoming cycles that employ water/steam or any other recirculating medium as the working fluid must provide additional hardware for recirculation and purification. For instance, steam-based plants require a boiler, a sophisticated steam turbine, condenser, purification system to prevent mineral deposits and scaling, pumps, etc. For this reason, they are practically limited to stationary applications such as public power utilities and industrial plant use and are precluded from mobile applications such as motor vehicles.

Motor vehicles represent a large portion of total energy use in the world today. There are, of course, differences between stationary power plants and power plants of motor vehicles. First, motor vehicles usually do not employ a turbine in the topping phase and so produce a less uniform flow rate of gases in the exhaust. Second, for a motor vehicle the equipment devoted to the bottoming cycle should be low cost, relatively simple to operate and maintain, and lightweight. Third, in a motor vehicle the working fluid of the bottoming cycle should be safe and not require extensive recirculation hardware.

The use of air as a working fluid for stationary power generating applications has been investigated. In U.S. Pat. No 4,751,814, "Air Cycle Thermodynamic Conversion System," a gas turbine topping cycle is combined with an air turbine bottoming cycle. Air is compressed in an intercooled multi-stage compression system that maintains air temperature as low as possible. Heat from the turbine exhaust is transferred to the compressed air via a counter flow heat exchanger, and the heated compressed air is expanded through an air turbine to provide at least sufficient work to run the compressors and preferably enough to use for other purposes. This system obviates sophisticated purification and processing of the working fluid (atmospheric air) if it is recirculated at all, and dispenses with bulky steam handling equipment. However, the system depends on turbine-based topping and bottoming apparatus which is not well suited to conventional motor vehicle applications.

Piston (or other means with sealed moving surfaces) compressors and expanders provide high efficiency for the processes of compression and expansion, but exhibit friction that is generally higher than a gas turbine of the same size (i.e., operating at similar gas flow rates). However, gas turbines (especially for the smaller sizes that would be needed for road vehicles) do not provide process efficiency as high as desired because of gas leakage around the edges of the turbine blades (the moving surfaces), which are not sealed.

Further, gas turbines operate at extremely high speed (often greater than 100,000 RPM), and the speed reduction gearing necessary to provide mechanical power at speeds usable in a mobile vehicle (e.g., less than 6,000 RPM) is costly and inefficient.

SUMMARY OF THE INVENTION

Therefore, an object of this invention is to provide a power train inclusive of a bottoming cycle which is suitable for use in automobiles.

Another object of the present invention is to provide such a power train using air as a working fluid in the bottoming cycle.

Yet another object of this invention is to provide a sealed moving surface compressor and expander design that performs compression and expansion with minimal friction, so that the net efficiency is significantly greater than that achievable with gas turbines.

A further object of this invention is to provide compressor and expander designs that operate efficiently at speeds below 6,000 RPM.

Accordingly, the present invention provides an air bottoming power train which includes a source of combustion exhaust gas, e.g. the internal combustion engine (ICE) of an automobile; a compressor which receives a gaseous working fluid and compresses to an elevated pressure; a cooler for cooling the compressor to provide near isothermal compression; an expander having a plurality of cylinders, each cylinder having a piston reciprocally mounted therein and operating in a two stroke cycle including an expansion stroke and an exhaust stroke, the pistons driving an output shaft; a compressed gas line for feeding the compressed gaseous working fluid from the compressor to the expander; and an expander valve for successively admitting the compressed gaseous working fluid from the compressed gas line into individual cylinders of said expander in succession and for continuously admitting the compressed gaseous working fluid to an individual cylinder through a first portion of the expansion stroke to maintain constant pressure. A heat exchanger is located in the compressed gas line for indirect heat exchange between the compressed gaseous working fluid and the exhaust gas, and is fed the exhaust gas by an exhaust gas line running through the heat exchanger.

A preferred expander includes a cylinder barrel with a plurality of cylinders formed in a circle within the cylinder barrel, open at one end face of the cylinder barrel and closed at an opposite endface of the cylinder barrel. A valve plate seals closed the one end of the cylinder barrel. The valve plate has a compressed gas inlet and an exhaust gas outlet. The cylinder barrel and the valve plate are mounted for relative rotation therebetween, the relative rotation serving to drive an output shaft. The expander preferably has a bent-shaft configuration, and has a total displacement which changes as an angle between the cylinder barrel and the output shaft is changed. The valve plate my have an arcuate groove in a face sealing against said cylinder barrel, the arcuate groove being in communication with the exhaust gas outlet and in register with the circle.

A second preferred embodiment of the expander is a Scotch yoke piston motor including plural paired and axially aligned cylinders on opposing sides of an output shaft and pistons reciprocally mounted in the cylinders and drivably connected to the output shaft. Each cylinder is axially divided into a thermally insulated outer portion and a cooled inner portion, the insulated outer portion being separated from the cooled inner portion by a thermal brake; and further, each piston is axially divided into a hollow outer and a cooled inner section, the cooled inner section having an exterior surface bearing oil rings sealing with the cooled inner portion of the cylinder, the hollow outer section being thermally isolated from the cooled inner section by a thermal brake.

The present invention utilizes an air bottoming cycle in conjunction with unique multi-cylinder piston compressor and expander designs that are well suited for use with the conventional automotive exhaust gas stream.

Figure 1:
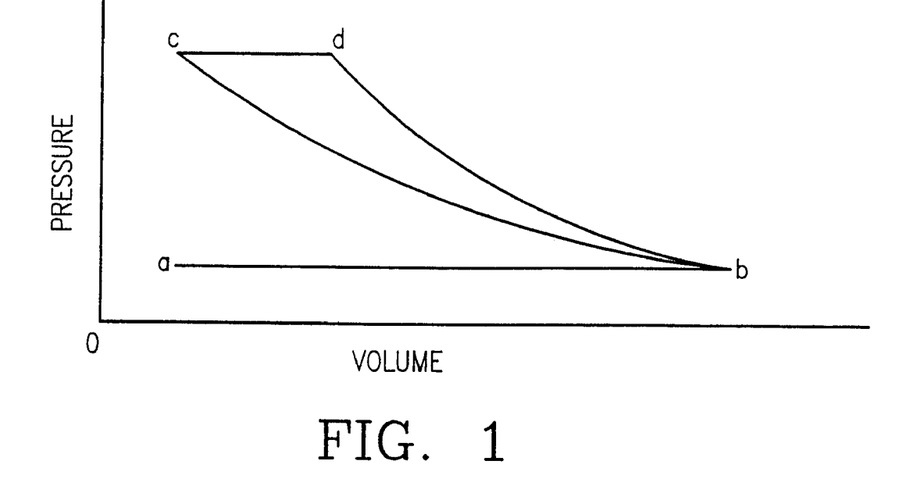
FIG. 1 is a graph illustrating an ideal air-bottoming thermodynamic cycle utilized in the present invention.

An ideal representation of the desired air bottoming thermodynamic cycle is shown in FIG. 1. The line ab represents intake of working fluid to the compressor. Line bc represents isothermal compression of the working fluid. Line cd represents absorption of heat by the working fluid at constant pressure during constant pressure expansion. Line db represents adiabatic expansion of the heated compressed gas to ambient conditions, producing the maximum possible work. Line ba represents the exhaust of the expanded air before the beginning of the next cycle.

The present invention effects an air bottoming cycle consisting of five distinct phases: (1) Compression, made relatively isothermal by cooling, of a gaseous working fluid such as air in a compressor, and optional buffering of the compressed air stream in an optional surge tank to reduce fluctuations in the heat exchanger inlet stream; (2) Addition of heat to the compressed working fluid at relatively constant pressure through a device such as a counter flow heat exchanger recovering heat from the internal combustion engine exhaust; (3) An initial, near constant pressure, expansion of the heated, compressed working fluid; (4) A final relatively adiabatic expansion of the partially expanded working fluid to as close to ambient conditions as possible, producing the maximum amount of work and; (5) Exhaust of the expanded working fluid from the expander or its conveyance to an appropriate destination such as the air intake of the internal combustion engine.

The cooled compressor performs a relatively isothermal compression of a working fluid such as air, which should be at the lowest practical temperature before entry to the heat exchanger in order to maximize the potential for recovery of heat. Near isothermal compression is achieved by one or more of the following means: cooling the compressor chamber walls using a water-based coolant, air or other fluid coolant; increasing the turbulence of the intake working fluid to increase the heat transfer coefficient and in-chamber mixing; increasing the roughness of the chamber walls to increase boundary layer turbulence and thus heat transfer coefficient and to increase heat transfer area; an oil jet spray to the bottom of each piston; and injecting a liquid into the compressing working fluid to extract heat from compression through phase change (evaporation) of the injected liquid. One unique feature of the present invention is the option of injecting the liquid fuel (to assist in cooling the compressing air) that, being mixed with the exhausted air at the end of the bottoming cycle, will subsequently be routed to the combustion engine which supplies the hot exhaust gas to "fuel" this bottoming engine. Methanol or ethanol are particularly good fuels for this use since they both can be easily mixed with water to provide an optimum mixture.

The compressed working fluid is passed through the optional surge tank and into the counter flow heat exchanger. The working fluid experiences a temperature increase, adding energy to the already compressed gas. Relatively constant pressure is assured because the heated, compressed working fluid enters the expansion chamber at a rate equal to the propensity for the heat to raise the pressure of the gas, and thus an initial constant pressure expansion phase is achieved. After the intake valve is closed, expansion continues to the end of the expansion stroke, producing mechanical work as it expands. The near-ambient pressure air exhausted by the expander could be released to the atmosphere or optionally fed to the air intake of the internal combustion engine. Optionally, the exhausted gas from the expander can be fed to the intake of the internal combustion engine (at any boost pressure) through the "Phase Change Heat Engine" which increases the efficiency of the overall cycle and serves as an intercooler for the charge air of the internal combustion engine. The exhaust gas could also be the source of heat energy for a "Phase Change Heat Engine" incorporated into yet another integrated configuration. The "Phase Change Heat Engine" is disclosed in my copending application filed on even date herewith, the teachings of which are incorporated herein by reference.

Use of a surge tank allows the use of fewer pistons in the compressor by moderating fluctuations in the compressor outlet stream and tends to reduce temperature increase during each compression stroke.

DESCRIPTION OF THE PREFERRED EMBODIMENTS

Figure 2:
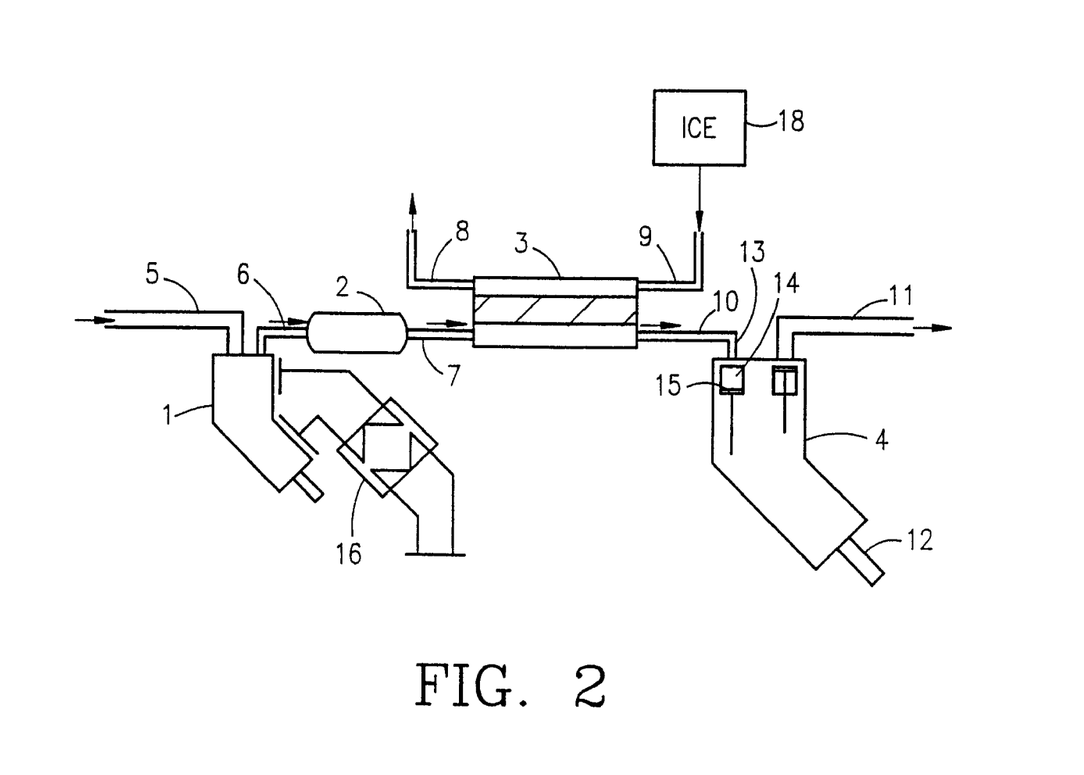
FIG. 2 is a schematic view of a first embodiment of a powertrain in accordance with the present invention.

FIG. 2 shows a preferred embodiment of the invention as including a cooled, fixed or variable displacement multi-cylinder piston type compressor 1 of bent-axis design, an optional surge tank 2, a counter flow heat exchanger 3, and a fixed or variable displacement multi-cylinder piston type expander 4 of bent axis design. Constant pressure during the constant pressure heat addition stage of the cycle is achieved by a unique design of expander 4.

Referring to FIG. 2, fresh air or other gaseous working fluid flows through the compressor intake 5 into the compressor 1 at either ambient pressure and temperature or at a boosted pressure level. A boosted pressure allows reduction of the size of the compressor and potentially the expander. A "plug" of compressed gas exits the compressor 1 at each compression stroke, through the compressor exhaust port 6 into the surge tank 2, thereby maintaining a designated tank pressure. A cooling apparatus 16 may operate on the compressor 1. The cooling apparatus of the preferred embodiment includes a water-based coolant which is circulated through a space around each cylinder and through the head and includes a means (not shown) of injecting a liquid into the compressing gas to extract heat from compressor through phase change of the injected liquid. Meanwhile, hot exhaust gases from an internal combustion engine or similar device 18 flow through the heat exchanger exhaust gas intake 9 into the heat exchanger 3 and out the heat exchanger exhaust 8. In so doing, much of the heat contained in the exhaust gas is imparted to the working fluid that has concurrently entered the heat exchanger intake 7 and is making its way to the heat exchanger working fluid exhaust port 10. Periodically, an intake port 13 to the expander 4 opens, and the expander chamber 14 expands in volume as it enters an expansion stroke. As the expander chamber expands, working fluid flows into the increasing volume chamber (cylinder) 14 at near constant pressure until the intake port closes. The intake port closes and the gas continues expansion in the expander chamber 14, producing mechanical work on a piston 15 transmitted to an output shaft 12. After expansion, the near-ambient pressure air is exhausted through the expander exhaust port 11, releasing it to the atmosphere or optionally feeding it to the air intake of the internal combustion engine.

Figure 3:
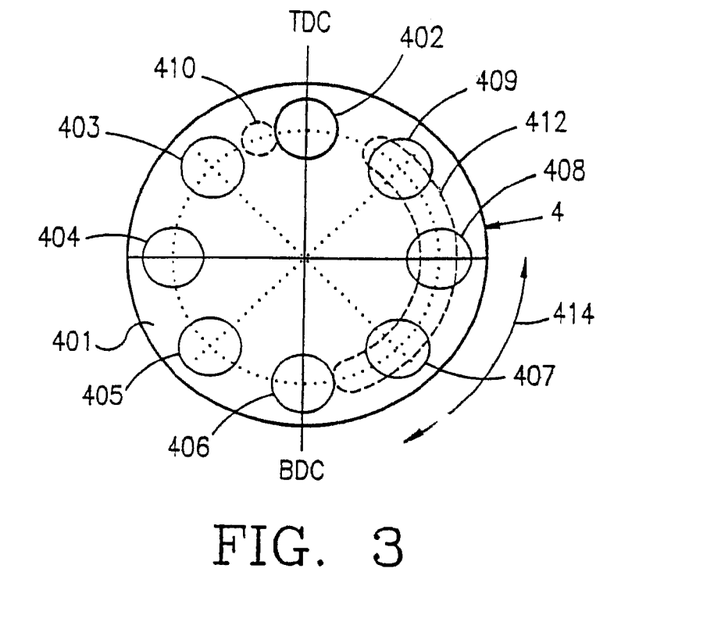
FIG. 3 is an end view of a preferred embodiment of the compressor and/or expander of the first embodiment depicted in FIG. 2.
Figure 4A:
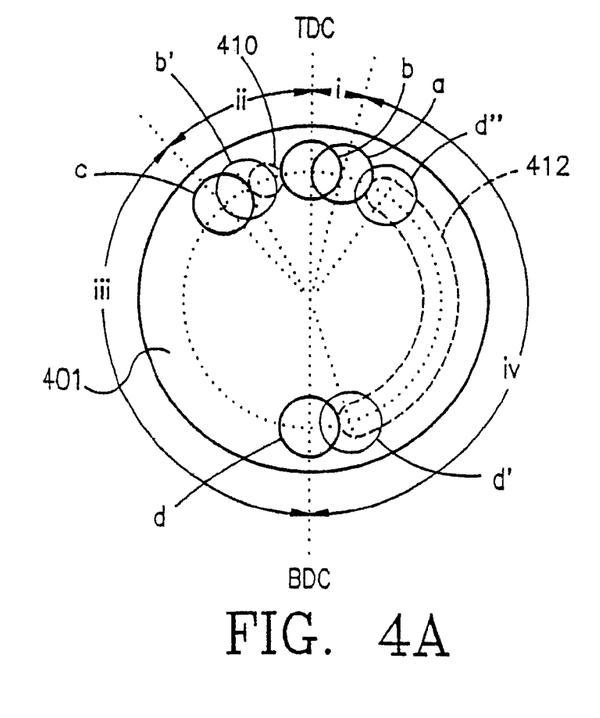
FIG. 4A is a schematic end view of the compressor and/or expander of the preferred embodiment illustrating the different phases of operation in one cycle and FIG. 4B is a side view of the embodiment shown in FIGS. 3 and 4A.
Figure 4B:
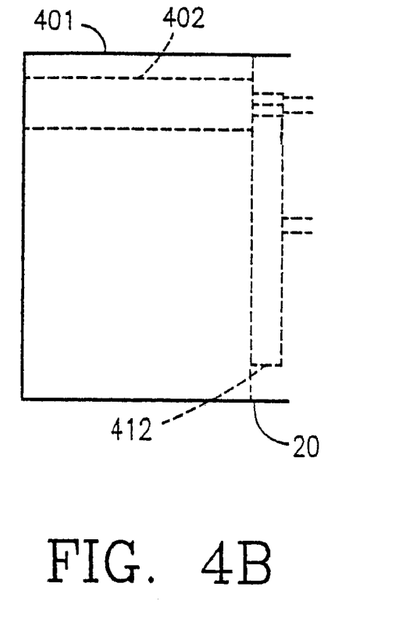

FIGS. 3 and 4 show one embodiment of an expander of the present invention having a bent-axis motor design. The expander 4 is a cylinder barrel 401 with multiple cylinders formed therein, here 8 in number shown as 402–409. Each of cylinders 402–409 receives a piston and the pistons drive an output shaft. For variable displacement configurations, the total displacement of the expander motor can be varied by tilting the angle of the cylinder barrel with respect to the plane of the output shaft. Minimum or zero displacement is achieved when the barrel and output shaft plane are parallel, while displacement increases as the angle becomes greater, up to some maximum displacement at some maximum angle.

An intake port 410 and exhaust port 412 communicate with piston/expansion chambers 402–409 at certain critical portions of each cycle, making possible the constant pressure method of operation described above. As the cylinder barrel 401 rotates, for example counter clockwise as indicated by the arrow, the pistons are also cycling between TDC and BDC and the intake and exhaust ports present themselves to each piston at the appropriate times.

The operation of the expander of the first embodiment will now explained with reference to FIGS. 4A and 4B, which follow the progress of a representative piston/expansion chamber 402 through several critical points of one cycle. In this illustration, the cylinder barrel 401 is shown rotating counter clockwise with the valve plate 20 stationary. As position a, the piston is nearing TDC and has just cleared exhaust port 412, sealing the chamber 402. At this point the chamber 402 contains trapped residual working fluid at the near ambient pressure and temperature of the expander exhaust. As point b approaches, the chamber continues to shrink in volume, thereby compressing the trapped working fluid. At position b, the piston has reached TDC and the working fluid in the sealed chamber 402 has reached maximum compression. Because the chamber 402 seals just prior to TDC, the volume of gas trapped and compressed, and hence the work and crank angle required, is minimal. The crank angle between positions a and b is calculated to achieve good sealing from exhaust port 412. At TDC the unswept volume is minimized to minimize the quantity of incoming gas from the heat exchanger required to pressurize the chamber 402. Also at point b, the intake port 410 is about to be exposed, providing passage for the heated compressed working fluid to enter the chamber 402. Past point b, the chamber begins increasing in volume as it travels toward BDC, accepting working fluid as work is produced. Position b' represents a typical position in this stage where the chamber is expanding in volume and the intake port supplies heated compressed working fluid to fill it. Although the chamber 402 is increasing in volume, pressure is relatively constant because the intake port 410 is supplying pressurized working fluid. Heated compressed working fluid continues to enter until position c, when the intake port loses contact with the chamber. From position c to position d, adiabatic expansion of the plug of heated, compressed working fluid that entered between b and c (as well as the initial residual compressed gas) takes place, producing additional work. At position d, the piston reaches BDC and the gas has been reduced to near ambient pressure. At this point the exhaust port 412 makes contact with the chamber 402, allowing the spent fluid to be exhausted as the piston begins rising again toward TDC and volume decreases. Positions d' and d" show example positions of the chamber near the beginning and end of the exhaust cycle. Finally, the cycle repeats itself as the piston reaches position a, once again sealing the chamber 402 and beginning the compression of the working fluid remaining in the chamber. Position a could extend as far as position b without changing the function of the expander. In an eight cylinder expander, for example, all eight pistons would perform this cycle in staged succession, producing a smooth flow of work on the expander shaft 12.

In FIG. 4(A), the angle (i) is the compression phase, angle (ii) is the constant pressure intake and expansion phase, angle (iii) is the adiabatic expansion phase, and angle (iv) is the exhaust phase.

Angles (ii) and (iii) together total 180°, corresponding to the expansion stroke. Angle (ii) may vary from about 18° to about 45°. In other words the constant pressure intake and expansion phase will usually be 10% to 25% of the total expansion stroke.

Because of their bent-axis design, the expander 4 and the compressor 1 are both capable of variable displacement, allowing, in addition to independently varying the speed of the expander and compressor, ability to precisely control mass flow rate and pressure through the system, thus ensuring stable and thermodynamically efficient operation.

Variations of foregoing design of the first embodiment will be apparent to one skilled in the art and include: (1) a fixed cylinder barrel and rotating valve plate, (2) a fixed cylinder barrel and individually timed valves, (3) a swash plate or wobble plate design where the pistons act on an inclined surface through a sliding pad at the base of the piston producing torque to the plate which drives an output shaft.

Figure 5:
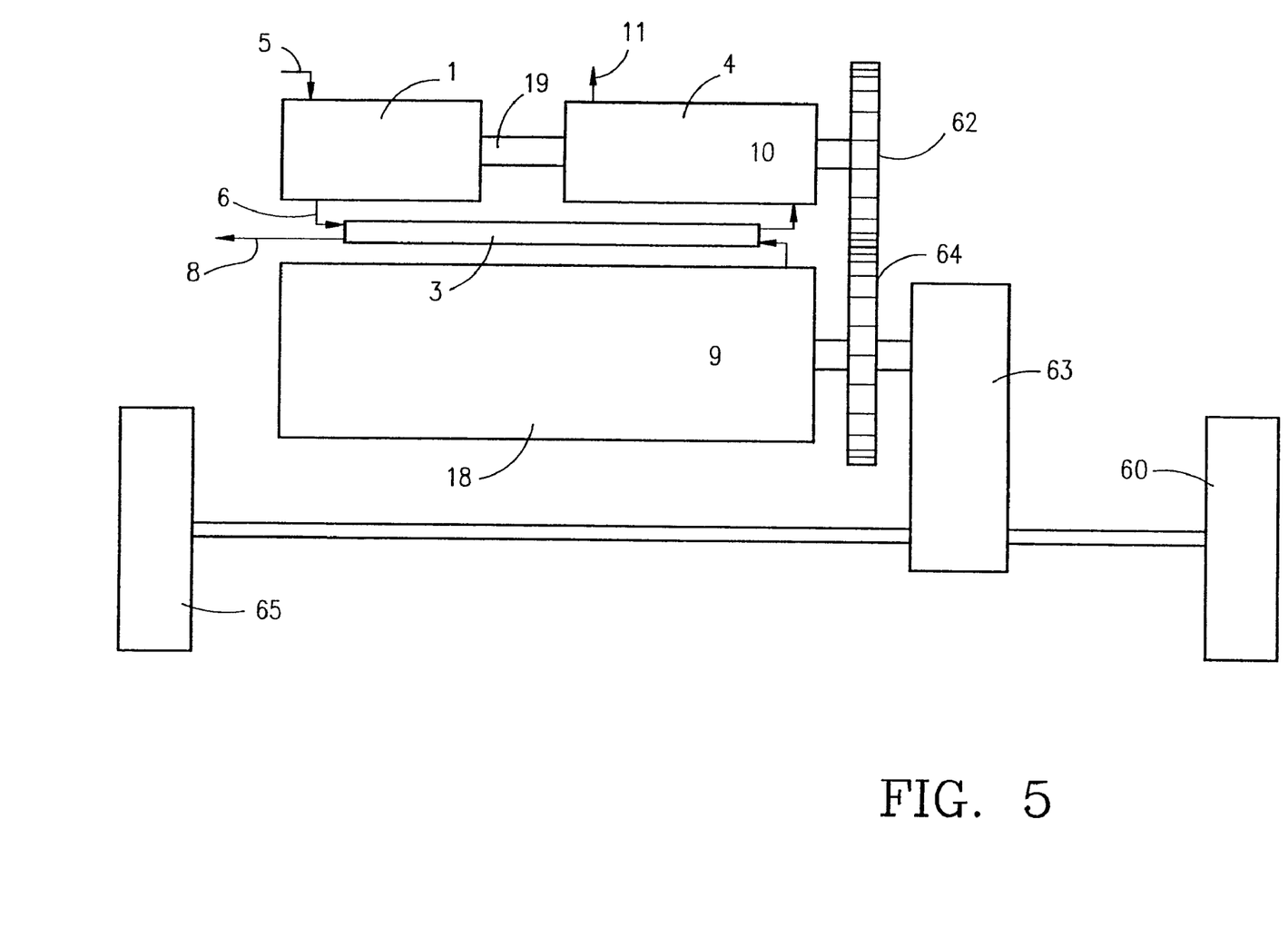
FIG. 5 is an illustration of the drive shaft connection for the compressor and the expander in the drive train of the embodiment of FIG. 2.

FIG. 5 illustrates the integration of the bottoming cycle engine with the internal combustion engine (ICE) 18 and the drive wheels 60 and 65 of a vehicle. Ambient air is inducted into compressor 1 through port 5. Shaft 19 from expander 4 drives compressor 1. Compressed air is discharged from compressor 1 through port 6 to heat exchanger 3 and heated compressed air exits heat exchanger 3 and enters expander 4 through port 10. Expander 4 expands the hot compressed air which produces power which drives compressor 1 and provides net power which is combined with the power output from ICE 18 by expander gear 62 driving ICE gear 64. The expanded air exits the expander through port 11. The combined power from the ICE and bottoming cycle engine flows through transmission 63 to wheels 60 and 65.

Figure 6:
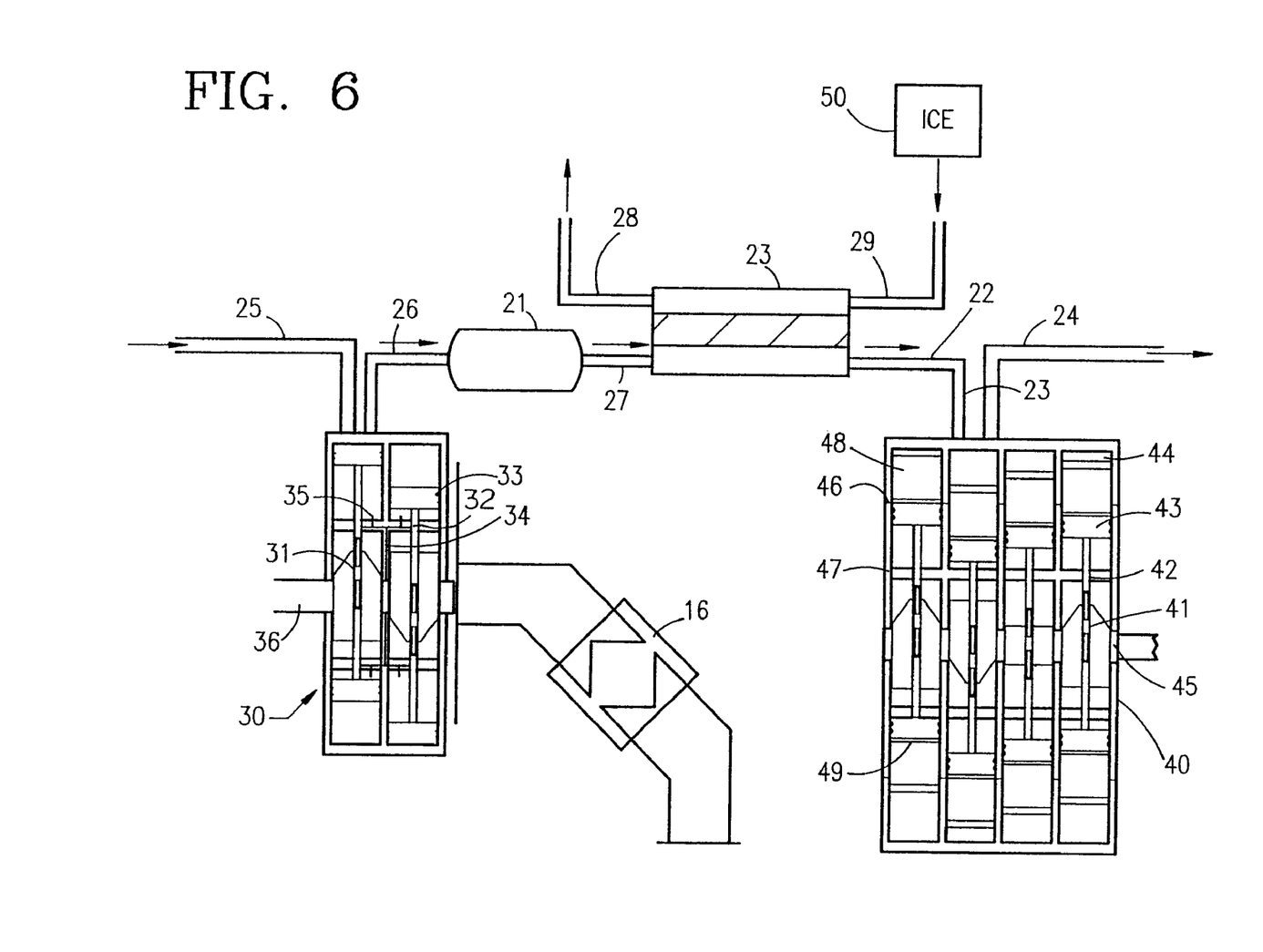
FIG. 6 is a schematic view of a second embodiment of the powertrain in accordance with the present invention incorporating a second preferred embodiment for the compressor and the expander.
Figure 7:
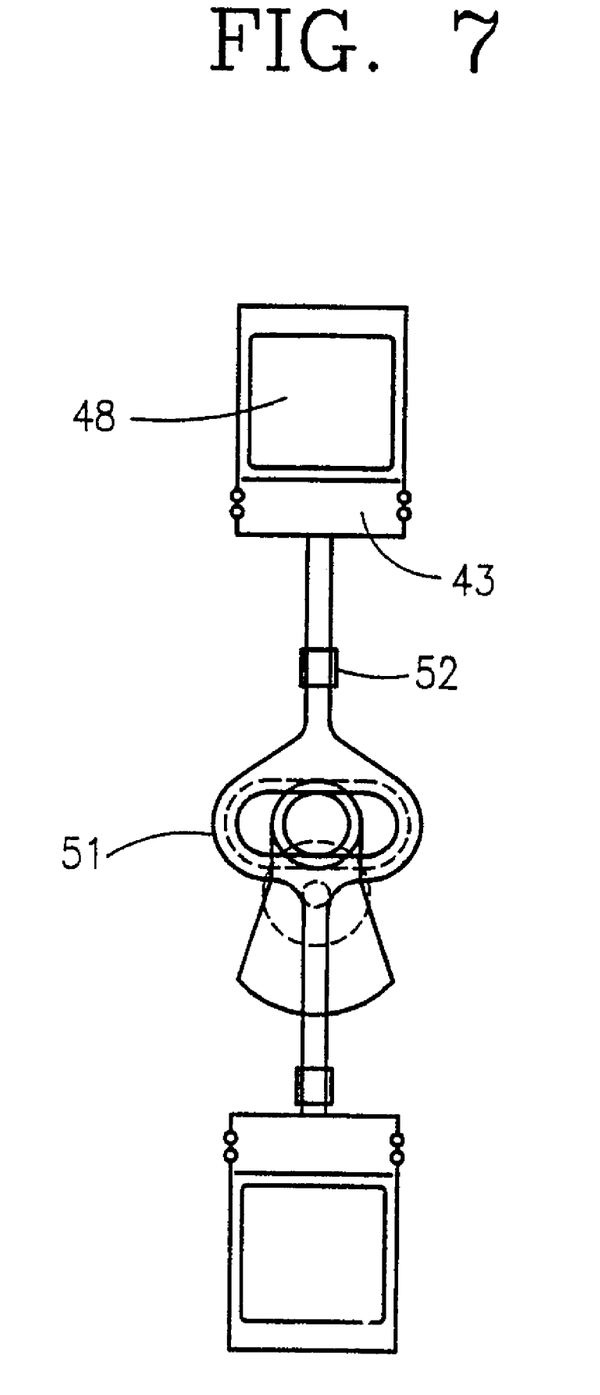
FIG. 7 is a schematic view of one pair of opposing pistons in the preferred embodiment for the expander shown in FIG. 6.

FIGS. 6 and 7 illustrate a second preferred embodiment which uses a crank-loop or "Scotch yoke" crank mechanism design with guide bearings as the compressor and/or expander, instead of the bent axis design of the first preferred embodiment. This second embodiment allows for constant pressure operation approximated through sizing the volumes of the chambers, the number of cylinders, and valve timing to ensure sufficiently constant thruflow.

In this second embodiment, the crank-loop or "Scotch yoke" design, with guide bearings which reduce piston side forces and prevent piston "cocking," is employed in the compressor and expander instead of a bent axis design. This design reduces side forces on the pistons by arranging the pistons in rigidly connected, 180° opposed pairs and driving crankshaft 36, 45 through a linear bearing at the center of the pair. "Scotch Yoke" type engines are known for very low friction, which makes the "crank mechanism" well suited, in combination with added guide bearings, as the piston compressor and/or expander of the invention. In the prior art, some side forces remain but this embodiment of the invention utilizes guide bearings/bushings to eliminate side forces and piston "cocking" and to further improve performance and reduce friction. Constant pressure operation is approximated through sizing the volumes of the chambers, the number of cylinders, and valve timing to ensure sufficiently constant thruflow.

Referring to FIG. 6, fresh air or other gas working fluid flows through the compressor intake 25 into the compressor 30 at either ambient pressure and temperature or at a boosted pressure level. As in the first embodiment, a boosted pressure allows a reduction in the size of the compressor and potentially the expander. For the two-stroke cycle of compressor 30, working fluid is received in the stroke from TDC to BDC and is compressed and exhausted in the stroke from BDC to TDC. Intake and exhaust valves of various designs (not shown) can be utilized to control the timing of the intake flow to and the exhaust flow from compressor 30.

In this second embodiment both the compressor 30 and the expander 40 employ a crank mechanism 31, 41 of the crank-loop or "Scotch yoke" design. These crank mechanisms 31, 41 are further illustrated with an end view on FIG. 7. Purtlier description can be found in the journal article *The Scotch Yoke Engine as a Compact and Smooth Running Motor for Passenger Vehicles*, MTZ Motortechnische Zeitschrift 58(1997)6, the teachings of which are incorporated herein by reference.

Referring again to FIG. 6, both the compressor 30 and expander 40 utilize guide bushings/bearings 32, 42 to insure against piston cocking or side force. Also shown is the oil supply 34 for the guide bushings/bearings 32. Oil is also utilized to cool the pistons 33 of the compressor 30 to help approach isothermal compression, and flows from ports 35.

A "plug" of compressed gas exits compressor 30 at each compression stroke, through the compressor exhaust port 26 into surge tank 21. A cooling apparatus 16 may operate on compressor 30 to assist in maintaining near isothermal compression. Hot exhaust gases from an internal combustion engine or similar device 50 flow through the heat exchanger exhaust gas intake 29 into heat exchanger 23 and out the heat exchanger exhaust 28. In so doing, much of the heat contained in the exhaust gas is imparted to the working fluid that has concurrently entered the heat exchanger intake 27 and is making its way to the heat exchanger working fluid exhaust port 22. Periodically, an intake port 23 to the expander 40 opens, and expander chamber 44 expands in volume as it enters an expansion stroke. As the expander chamber expands, working fluid flows into the increasing volume at near approximately constant pressure until the intake port 23 closes. The intake port 23 closes and the gas continues expansion in an expander chamber 44, producing mechanical work on a piston 43 transmitted to an output shaft 45. After expansion, the near-ambient pressure gas is exhausted by the expander exhaust port 24, releasing it to the atmosphere or optionally feeding it to the air intake of internal combustion engine 50.

It is especially important to operate expander 40 as near adiabatically as possible, to maximize efficiency. Toward this end, the expander expansion chambers 44 are thermally insulated, with thermal brakes 46 separating the insulated chambers 44 from the cooled cylinders 47 where the rings of piston 43 must travel on a cooled and oil lubricated surface. Unique pistons 43 each have an upper, hot portion 48 which travels through the hot expander chamber 44, insuring the hot expansion gases do not significantly access the cooled cylinders 47. The piston hot portions 48 are hollow to the maximum extent feasible to minimize piston mass and reduce heat transfer to the lower, cooled portion of piston 43. A final thermal brake 49 separates the hot, upper portion 48 from the cooled, lower portion of piston 43. The upper portion 48 is a high temperature metal alloy, preferably with an insulating ceramic outer coating; or it may be an all ceramic component, all carbon-carbon component, or other suitable high temperature material with low heat transfer characteristics.

The thermal brakes are gaskets which may be an insulating ceramic or other conventional thermal insulator.

One modification eliminates the surge tank, and the speed of the expander is fixed at a multiple of the speed of the compressor. An alternate embodiment could include a surge tank, in which case the speed of the compressor could vary.

In another modification expanded air would be recirculated, or fed to the air intake of the ICE, rather than exhausted, optionally at a pressure providing boost to the internal combustion engine.

Other modifications using other types of sealed moving surfaces for the compressor and expander will be apparent to those skilled in the art from the foregoing description of two preferred embodiments.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed:

1. A method of operating an air bottoming power train for a vehicle having at least a pair of drive wheels, said method comprising:

generating a power output and a combustion exhaust gas by operation of an internal combustion engine;

isothermally compressing a gaseous working fluid to an elevated pressure, utilizing a compressor while cooling the compressor;

heating the compressed gaseous working fluid by indirect heat exchange with the exhaust gas;

continuously admitting the heated compressed gaseous working fluid to an expander to operate the expander in a two stroke cycle including an expansion stroke and an exhaust stroke, the expander having a plurality of cylinders, each cylinder having a piston reciprocally mounted therein, said pistons producing power output by rotatably driving an output shaft, the heated compressed gaseous working fluid being continuously admitted to an individual cylinder of the expander through a first portion of the expansion stroke to maintain constant pressure and said continuous admitting through said first portion being repeated for the other cylinders of said expander, in succession, wherein the heated compressed gaseous working fluid is continuously admitted to the individual cylinder of the expander in said first portion of the expansion stroke through an inlet port having a diameter smaller than that of the individual cylinder; and combining the power outputs of the internal combustion engine and the expander for transmitting the combined power outputs to the drive wheels.

2. The method of claim 1 wherein said compressor is driven solely by said expander.

3. The method of claim 1 wherein, in the remainder of the expansion stroke following said first portion, said compressed gaseous working fluid undergoes adiabatic expansion.

4. The method of claim 3 wherein said first portion is 10–25% of the total expansion stroke.

5. The method of claim 3 wherein an individual cylinder of the expander is in communication with an exhaust port from a point immediately following bottom dead center to a point preceding top dead center by a distance approximately equal to the diameter of the cylinder.

6. The method of claim 5 wherein said exhaust port is in the shape of an arc having a width less than that of the diameter of the cylinder.

7. The method of claim 1 wherein an individual cylinder of the expander is in communication with an exhaust port from a point immediately following bottom dead center to a point preceding top dead center by a distance approximately equal to the diameter of the cylinder.

8. The method of claim 7 wherein said exhaust port is in the shape of an arc having a width less than that of the diameter of the cylinder.

9. The method of claim 1 wherein said arc extends from a point located a distance beyond bottom dead center approximately equal to the radius of the cylinder to a point preceding top dead center by a distance approximately equal to the diameter of the cylinder.

* * * * *